(12) United States Patent
Son et al.

(10) Patent No.: US 7,885,671 B2
(45) Date of Patent: Feb. 8, 2011

(54) SYSTEM AND METHOD FOR STATE SYNCHRONIZATION BETWEEN A BASE STATION AND A MOBILE STATION IN A MOBILE COMMUNICATION SYSTEM

(75) Inventors: Yeong-Moon Son, Anyang-si (KR); Hong-Sung Chang, Suwon-si (KR); Pan-Yuh Joo, Seoul (KR); Jung-Je Son, Seongnam-si (KR); Jae-Weon Cho, Suwon-si (KR); Mi-Hyun Lee, Seoul (KR); Hyun-Jeong Kang, Seoul (KR); Song-Nam Hong, Seoul (KR); Sung-Jin Lee, Suwon-si (KR); Hyoung-Kyu Lim, Seoul (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 987 days.

(21) Appl. No.: 11/481,534

(22) Filed: Jul. 6, 2006

(65) Prior Publication Data

US 2007/0010267 A1 Jan. 11, 2007

(30) Foreign Application Priority Data

Jul. 6, 2005 (KR) ...................... 10-2005-0060945

(51) Int. Cl.
*H04B 7/00* (2006.01)
*H04B 15/00* (2006.01)

(52) U.S. Cl. ...................... 455/502; 455/525; 455/561; 455/560; 370/324; 370/350; 370/503; 370/507; 370/509; 370/510; 370/512; 370/514; 370/520; 370/395.62

(58) Field of Classification Search ................. 370/329, 370/338, 342, 441, 324, 350, 503, 507, 509, 370/510, 512, 514, 520, 395.62; 455/403, 455/442, 502, 525, 561, 560

See application file for complete search history.

(56) References Cited

U.S. PATENT DOCUMENTS 5,293,380 A * 3/1994 Kondo ........................ 370/337

(Continued)

FOREIGN PATENT DOCUMENTS

EP 1 424 789 6/2004

(Continued)

OTHER PUBLICATIONS

IEEE, (Part 16: Air Interface for Fixed Broadband Wireless Access Systems; IEEE Std 802.16-2004; Oct. 1, 2004, pp. 1-857).*

*Primary Examiner*—Vincent P Harper
*Assistant Examiner*—Khalid Shaheed
(74) *Attorney, Agent, or Firm*—The Farrell Law Firm, LLP

(57) ABSTRACT

A system and method for state synchronization between a base station and a mobile station in a mobile communication system. A count value indicative of a state change of the base station is received. The received current count value is compared with a previous count value previously received and stored. If the current count value is different from the previous count value, the mobile station performs a network entry procedure with the base station.

12 Claims, 9 Drawing Sheets

U.S. PATENT DOCUMENTS

| | | | |
|---|---|---|---|
| 5,920,557 A * | 7/1999 | Hirata | 370/350 |
| 6,344,821 B2 | 2/2002 | Norimatsu | |
| 6,359,871 B1 * | 3/2002 | Chung et al. | 370/338 |
| 6,452,541 B1 | 9/2002 | Zhao et al. | |
| 6,477,183 B1 | 11/2002 | Yamamoto | |
| 6,477,385 B1 | 11/2002 | Hara | |
| 6,564,052 B1 | 5/2003 | Kawano et al. | |
| 6,707,856 B1 | 3/2004 | Gardner et al. | |
| 7,009,953 B2 | 3/2006 | Tiedemann, Jr. | |
| 2001/0005361 A1 | 6/2001 | Lipsanen | |
| 2001/0029188 A1 | 10/2001 | Sarkkinen et al. | |
| 2003/0133429 A1 * | 7/2003 | Choi et al. | 370/342 |
| 2004/0085921 A1 | 5/2004 | Lin | |
| 2004/0176094 A1 * | 9/2004 | Kim et al. | 455/438 |
| 2004/0202119 A1 * | 10/2004 | Edge | 370/324 |
| 2005/0101330 A1 * | 5/2005 | Chang et al. | 455/446 |
| 2005/0272403 A1 | 12/2005 | Ryu et al. | |

FOREIGN PATENT DOCUMENTS

| | | |
|---|---|---|
| JP | 10-303914 | 11/1998 |
| JP | 2000-278303 | 10/2000 |
| JP | 2001-326955 | 11/2001 |
| JP | 2003-530795 | 10/2003 |
| RU | 2 127 948 | 3/1999 |
| RU | 2 212 119 | 9/2003 |
| TW | 490954 | 6/2002 |
| TW | 578409 | 3/2004 |

* cited by examiner

SYSTEM AND METHOD FOR STATE SYNCHRONIZATION BETWEEN A BASE STATION AND A MOBILE STATION IN A MOBILE COMMUNICATION SYSTEM

PRIORITY

This application claims priority under 35 U.S.C. §119 to an application entitled "System and Method for State Synchronization between a Base Station and a Mobile Station in a Mobile Communication System" filed in the Korean Intellectual Property Office on Jul. 6, 2005 and assigned Serial No. 2005-60945, the contents of which are incorporated herein by reference.

BACKGROUND OF THE INVENTION

1. Field of the Invention

The present invention generally relates to a mobile communication system, and more particularly to a system and method for state synchronization between a base station and a mobile station in a mobile communication system using frequency multiplexing.

2. Description of the Related Art

An Institute of Electrical and Electronics Engineers (IEEE) 802.16 communication system performs communication using connection information negotiated between a subscriber station and a base station.

FIG. 1 schematically illustrates a structure of the conventional IEEE 802.16 communication system.

In relation to FIG. 1, a wireless Metropolitan Area Network (MAN) communication system serving as a Broadband Wireless Access (BWA) communication system supports a wider service area and a higher transmission rate than a wireless Local Area Network (LAN) communication system. The IEEE 802.16 communication system employs Orthogonal Frequency Division Multiplexing (OFDM) and/or Orthogonal Frequency Division Multiple Access (OFDMA) for supporting a broadband transmission network in a physical channel of the wireless MAN communication system. That is, the IEEE 802.16 communication system is a BWA communication system using an OFDM/OFDMA scheme.

Because the IEEE 802.16 communication system employs the OFDM/OFDMA scheme in the wireless MAN communication system, a physical channel signal can be transmitted through a plurality of subcarriers, and therefore high-speed data can be transmitted.

Referring to FIG. 1, the IEEE 802.16 communication system has a multi-cell structure, i.e., cells 100 and 150, and is provided with a Base Station (BS) 110 for covering the cell 100, a BS 140 for covering the cell 150, and multiple Mobile Stations (MSs) 111, 113, 130, 151, and 153. Signal transmission and reception between the BSs 110 and 140 and the MSs 111, 113, 130, 151, and 153 are performed using the OFDM/OFDMA scheme.

FIG. 2 illustrates a network reference model of a conventional mobile communication system.

Referring to FIG. 2, the network reference model is configured with MSs 210 and 220, BSs 230 and 240, and an Authentication and Service Authorization (ASA) server 250.

Communication between the MS 210 or 220 and the BS 230 or 240 is performed through a "U" interface. The "U" interface is an interface in which operations of a Physical (PHY) layer and a Media Access Control (MAC) layer and a message exchange-related operation are defined.

Communication between the BSs 230 and 240 is performed through an "IB" interface. The "IB" interface is an interface in which message transmission operations relative to information about an MS for which a handover is performed, a BS state, a request to an opposite BS, and so on are defined.

On the other hand, communication between the BS 230 or 240 and the ASA server 250 is performed through an "A" interface. The "A" interface is an interface in which an operation and function between the BS 230 or 240 and the ASA server 250 are defined for an authentication procedure of the MSs 210 and 220.

FIG. 3 illustrates an internal structure of the BS in the conventional mobile communication system.

Referring to FIG. 3, the BS is provided with a Control Processor Unit (CPU) 310, OFDMA PHY Units (OPUs) 315 and 320, Channel Units (CHUs) 325, 330, 335, and 340, and a Network Processor Unit (NPU) 345. The components are connected to system buses (BUSs). Data and control information are transmitted and received through the BUSs.

The OPUs 315 and 320 demodulate and decode OFDMA symbols received in various frequency bands to extract data, or encode and modulate data into OFDMA symbols. That is, the OPUs 315 and 320 decode OFDMA data signals received from the MSs, extract MAC frames to transfer the extracted MAC frames to the associated CPU, or encode MAC frames received from the CHUs 325, 330, 335, and 340 into OFDMA symbols to transmit the OFDMA symbols to the MSs.

The CHUs 325, 330, 335, and 340 generate high-layer Protocol Data Units (PDUs) (e.g., Internet Protocol (IP) packets) from the received MAC frames, or divide high-layer PDUs into MAC frames. That is, the CHUs 325, 330, 335, and 340 collect the MAC frames via the BUS from the OPUs 315 and 320 to generate the high-layer PDUs and transfer the generated high-layer PDUs to the NPU 345, or divide the high-layer PDUs received from the NPU 345 into the MAC frames to transmit the MAC frames to the OPUs 315 and 320. The NPU 345 performs a function for communicating with a network connected to the BS, i.e., the BS or ASA server.

The CPU 310 is responsible for all control functions of the BS. That is, a command for performing a function mapped to an instruction input from a BS operator is transferred to all the units.

As illustrated in FIG. 3, the BS has a structure capable of processing data of the MSs to transmit the processed data using the "IB" or "A" interface even though the CPU is disabled or uninstalled due to failure. The system has a structure in which a function of the BS is not affected even though one unit is disabled or uninstalled.

FIG. 4 schematically illustrates a downlink (DL) frame format in a mobile communication system using OFDM/OFDMA. Specifically, FIG. 4 schematically illustrates the DL frame format of the IEEE 802.16 communication system.

Referring to FIG. 4, the DL frame is provided with a preamble portion 400, a broadcast control portion 410, and a plurality of Time Division Multiplexing (TDM) or Time Division Multiple Access (TDMA) portions 420 and 430. A synchronization signal for synchronization acquisition between the BS and the MS, i.e., a preamble sequence, is transmitted in the preamble portion 400.

The broadcast control portion 410 is provided with a Frame Control Header (FCH) field 415, a DL_MAP field 411, and an Uplink (UL)_MAP field 413. Herein, the FCH field is illustrated as a Downlink Frame Prefix (DLFP) field in which DLFP information is transmitted in FIG. 4. The DLFP format is shown in Table 1.

TABLE 1

| Syntax | Size | Notes |
| --- | --- | --- |
| DL_Frame_Prefix_Format( ) { | | |
| Used subchannel bitmap | 6 bits | Bit #0: Subchannels 0-11 are used |
| | | Bit #1: Subchannels 12-19 are used |
| | | Bit #2: Subchannels 20-31 are used |
| | | Bit #3: Subchannels 32-39 are used |
| | | Bit #4: Subchannels 40-51 are used |
| | | Bit #5: Subchannels 52-59 are used |
| Reserved | 1 bit | Shall be set to zero |
| Repetition_Coding_Indication | 2 bits | 00 - No repetition coding on DL-MAP |
| | | 01 - Repetition coding of 2 used on DL-MAP |
| | | 10 - Repetition coding of 4 used on DL-MAP |
| | | 11 - Repetition coding of 6 used on DL-MAP |
| Coding_Indication | 3 bits | 0b000 - CC encoding used on DL-MAP |
| | | 0b001 - BTC encoding used on DL-MAP |
| | | 0b010 - CTC encoding used on DL-MAP |
| | | 0b011 - ZT CC used on DL-MAP |
| | | 0b100 to 0b111 - Reserved |
| DL-Map_Length | 8 bits | |
| Reserved | 4 bits | |

As shown in Table 1, the DLFP field includes a plurality of Information Elements (IEs). The IEs are a used subchannel bitmap for indicating the number of subchannel groups used in a partial usage subchannel zone of a DL frame, a repetition coding indication used in the DL_MAP, a coding indication for indicating a modulation and coding scheme used to transmit the DL_MAP, and a DL_MAP length.

The DL_MAP field 411 is a field in which a DL_MAP message is transmitted. IEs included in the DL_MAP message are shown in Table 2.

TABLE 2

| Syntax | Size | Notes |
| --- | --- | --- |
| DL-MAP_Message_Format( ) { | | |
| Management Message Type = 2 | 8 bits | |
| PHY Synchronization Field | Variable | See appropriate PHY specification |
| DCD Count | 8 bits | |
| Base Station ID | 48 bits | |
| Number of DL-MAP Elements n | 16 bits | |
| Begin PHY Specific Section { | | See applicable PHY section |
| for (i = 1; i < = n, i++) { | | For each DL-MAP element 1 to n |
| DL_MAP_Information_Element( ) | Variable | See corresponding PHY specification |
| if !(byte boundary) { | | |
| Padding Nibble | 4 bits | Padding to reach byte boundary |
| } | | |
| } | | |
| } | | |
| } | | |

As shown in Table 2, the DL_MAP message includes a plurality of IEs. The IEs are a management message type corresponding to a type of message to be transmitted, a PHY synchronization field mapped to modulation and demodulation schemes applied to a physical channel for synchronization acquisition, a Downlink Channel Descriptor (DCD) count mapped to a configuration change of a DCD message including a DL burst profile, a BS identifier (ID), and the number of DL_MAP elements, n, subsequent to the BS ID.

To decode the DL burst profile, DL-MAP IEs are mapped to DCD messages for indicating modulation and coding schemes and physical characteristics in a one-to-one correspondence. That is, the DCD message includes the DL burst profile. Thus, the MS receives the DL-MAP message and must know in advance the DCD information before decoding the received DL-MAP message.

IEs included in the DCD message are shown in Table 3.

TABLE 3

| Syntax | Size | Notes |
| --- | --- | --- |
| DCD_Message_Format( ) { | | |
| Management Message Type = 1 | 8 bits | |
| Downlink channel ID | 8 bits | |
| Configuration Change Count | 8 bits | |
| TLV Encoded information for the overall channel | Variable | TLV specific |
| Begin PHY Specific Section { | | See applicable PHY section |
| for (i = 1; i < = n, i++) { | | For each downlink burst profile 1 to n |
| Downlink_Burst_Profile | | PHY specific |
| } | | |
| } | | |
| } | | |

As shown in Table 3, the DCD message includes a plurality of IEs. The IEs are a management message type corresponding to a type of message to be transmitted, a used DL ID, a configuration change count mapped to a configuration change of DL channel information, Type/Length/Value (TLV) encoded information for the overall channel, and a PHY specific section. The UL-MAP field 413 is a field in which a UL-MAP message is transmitted.

As described above, the CPU of the BS is responsible for the overall control of the BS in the IEEE 802.16 communication system. In other words, the CPU manages the BS configuration/setup information, information about a connection with the MS, the state information of the MS (e.g., information about the MS sleep mode, normal state, and idle mode), and the MS configuration/setup information, and performs proper operations mapped to a plurality of occurred events. When an unexpected error occurs in the CPU or an operator restarts the CPU, the MS may never know it. Thus, when the CPU has been reset and restarted, the MS continuously transmits its own data traffic in a state in which it does not know that the CPU has been reset and restarted. In this case, the CPU cannot manage an associated MS because connection, state and configuration information managed by the CPU is absent due to the reset.

In other words, an MS transmits UL data using a connection ID (CID) already assigned before the reset of the CPU, but the BS may never know a CID used in an MS for receiving a service. Thus, a real need exists for a method capable of maintaining state synchronization between the BS and the MS when the CPU of the BS is reset.

SUMMARY OF THE INVENTION

It is, therefore, an object of the present invention to provide a system and method that can maintain state synchronization between a base station and a mobile station in a broadband wireless access communication system.

In accordance with an aspect of the present invention, there is provided a method for state synchronization with a base station in a mobile station of a mobile communication system, including receiving a current count value indicative of a state change of the base station, comparing the received current count value with a previous count value previously received and stored, and performing a network entry procedure with the base station if the current count value is different from the previous count value.

In accordance with another aspect of the present invention, there is provided a method for state synchronization with a mobile station in a base station of a mobile communication system, including resetting a control processor unit of the base station, setting a count value according to the reset and transmitting the set count value to the mobile station, and performing a network entry procedure with the mobile station.

In accordance with a further aspect of the present invention, there is provided a system for state synchronization between a base station and a mobile station in a mobile communication system, including the base station for setting and transmitting a current count value indicative of a state change between the mobile station and the base station, and the mobile station for receiving the count value from the base station, comparing the received current count value with a previous count value previously received and stored, and performing a network entry procedure with the base station if the current count value is different from the previous count value.

In accordance with yet another aspect of the present invention, there is provided a method for state synchronization between a base station and a mobile station in a mobile communication system, including setting a count value indicative of a state change of the base station and transmitting a Base Station Reset INDication (BS_RESET_IND) message comprising the count value to the mobile station, extracting, by the mobile station, the set count value comprised in the BS_RESET_IND message, comparing the extracted set count value with a previous count value previously extracted and stored, and performing a network entry procedure with the base station if the set count value is different from the previous count value.

In accordance with still another aspect of the present invention, there is provided a method for state synchronization between a base station and a mobile station in a mobile communication system, including setting a count value indicative of a state change relative to the base station and configuring and transmitting a Type/Length/Value (TLV) encoding field to the mobile station, extracting, by the mobile station, the set count value comprised in the TLV encoding field, comparing the extracted set count value with a previous count value previously extracted and stored, and performing a network entry procedure with the base station if the set count value is different from the previous count value.

In accordance with a further aspect of the present invention, there is provided a method for state synchronization between a base station and a mobile station in a mobile communication system, including setting a count value indicative of a state change relative to the base station and configuring and transmitting a Downlink Frame Prefix (DLFP) comprising the count value, extracting, by the mobile station, the set count value comprised in the DLFP, comparing the extracted set count value with a previous count value previously stored, and performing a network entry procedure with the base station if the set count value is different from the previous count value.

In accordance with still a further aspect of the present invention, there is provided a method for state synchronization with a base station in a mobile station of a mobile communication system, including sending an initial ranging request to the base station, receiving a response to the initial ranging request from the base station, the response comprising a first count value indicative of a number of state changes of the base station, storing the first count value; receiving a second count value indicative of a number of state changes from the base station, and performing a network entry procedure with the base station if the second count value is different from the first count value.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Figure 1:
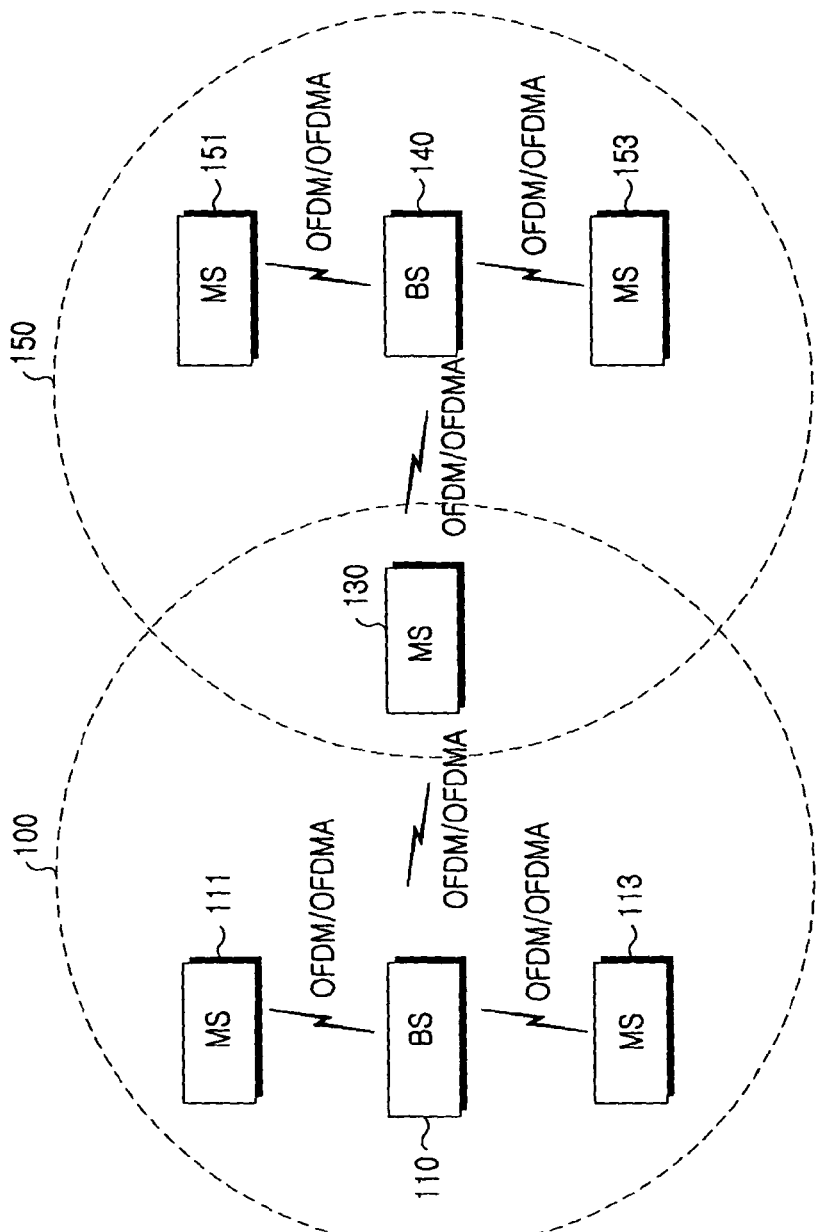
FIG. 1 schematically illustrates a structure of a conventional Institute of Electrical and Electronics Engineers (IEEE) 802.16 communication system.
Figure 2:
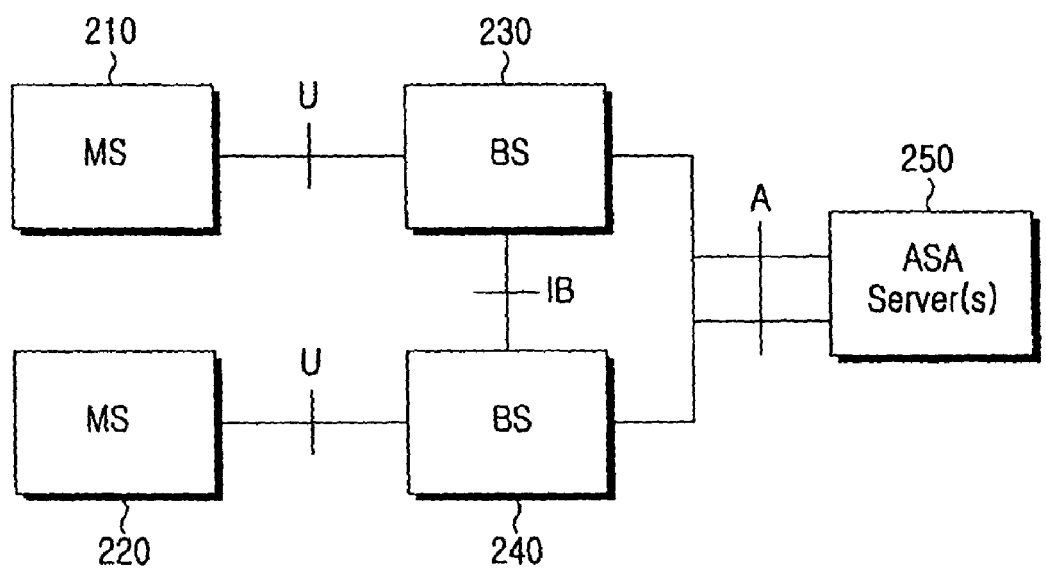
FIG. 2 illustrates a network reference model of a conventional mobile communication system.
Figure 3:
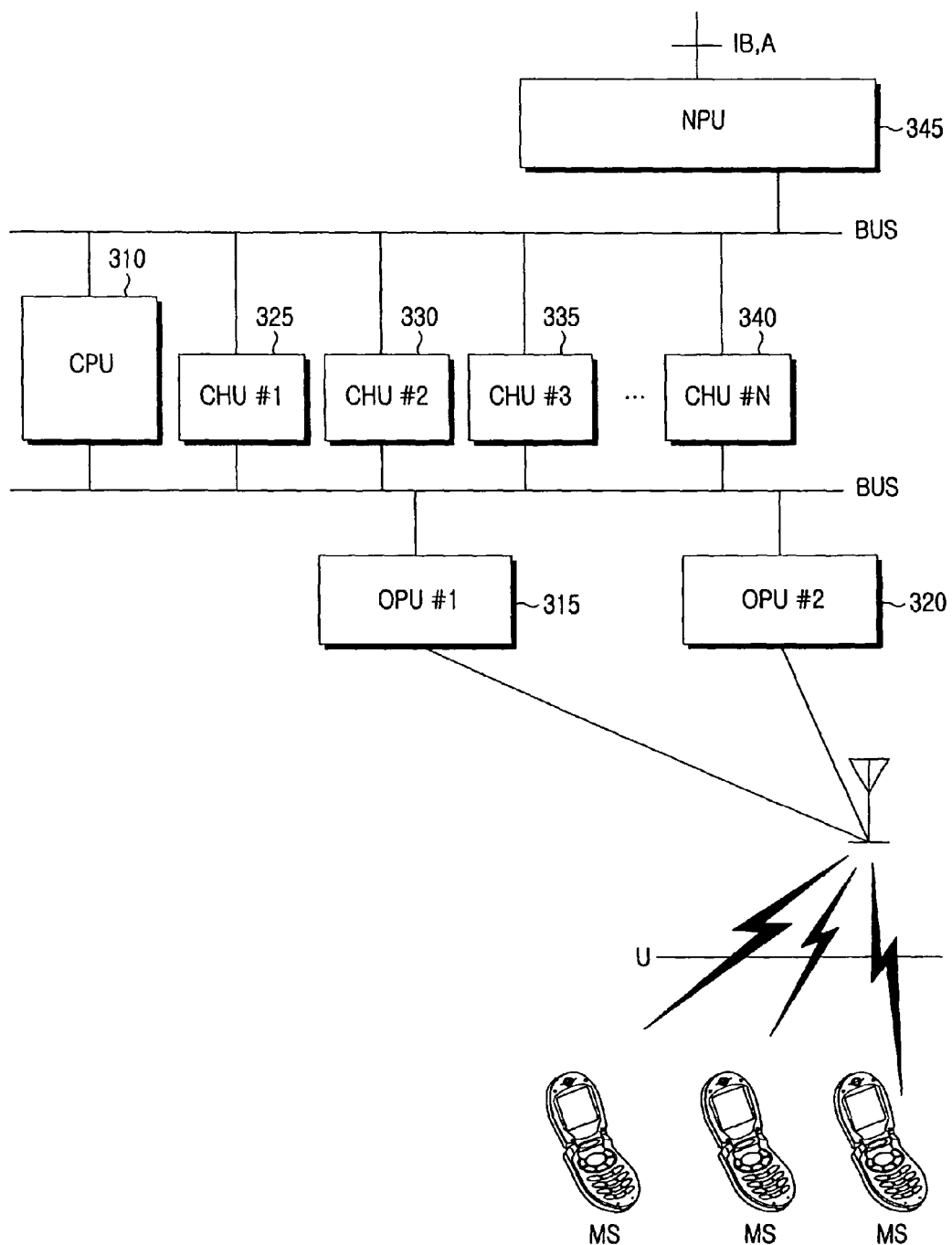
FIG. 3 illustrates an internal structure of a Base Station (BS) in the conventional mobile communication system.
Figure 4:
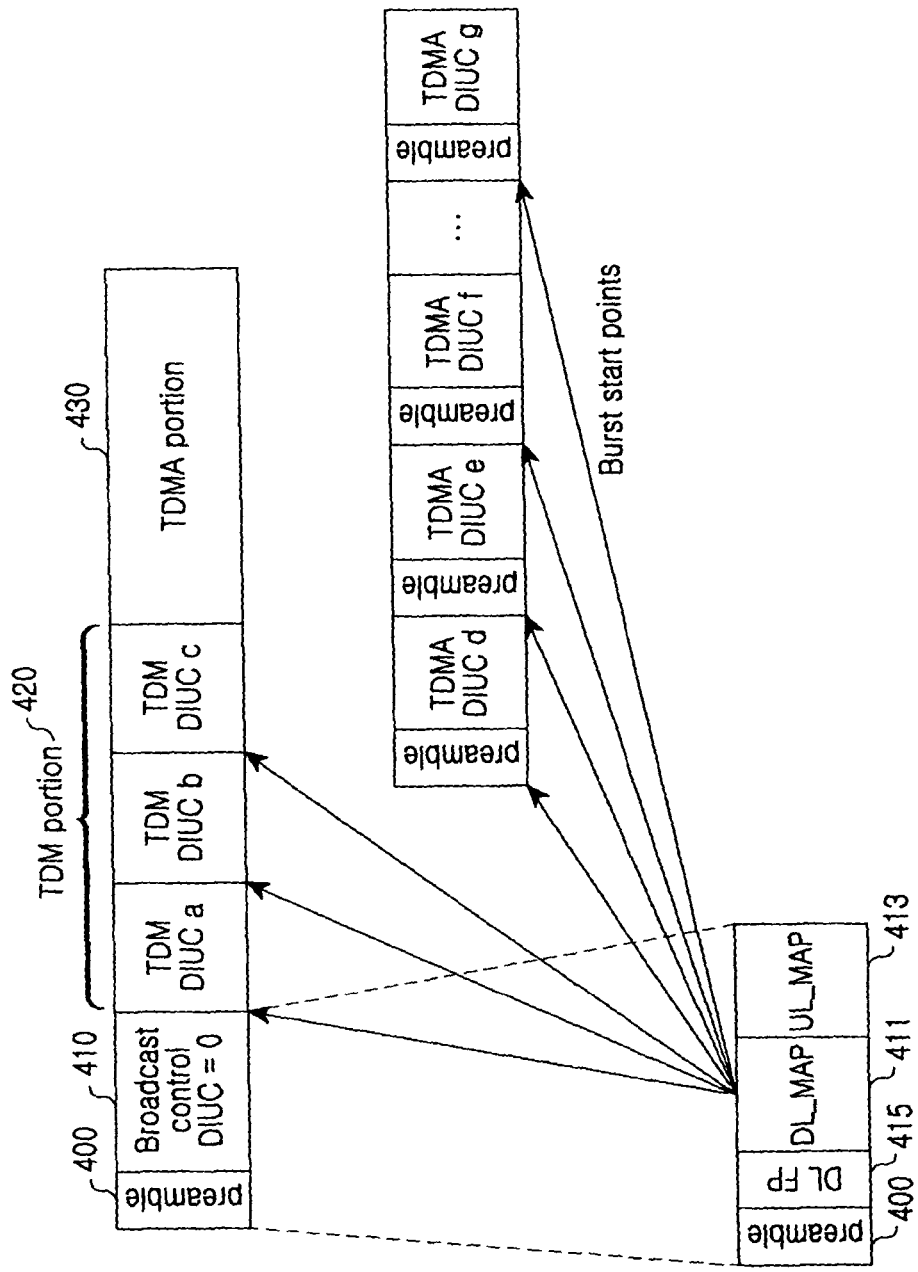
FIG. 4 schematically illustrates a downlink frame format in a mobile communication system using Orthogonal Frequency Division Multiplexing/Orthogonal Frequency Division Multiple Access (OFDM/OFDMA)

Preferred embodiments of the present invention will be described in detail herein below with reference to the accompanying drawings. In the following description, detailed descriptions of functions and configurations incorporated herein that are well known to those skilled in the art are omitted for clarity and conciseness.

The present invention is a system and method that can maintain connection, state and configuration synchronization between a Base station (BS) and a Mobile Station (MS) in a mobile communication system.

In detail, the BS of the present invention increments a restart count value by one when the BS restarts due to a critical error or an operator's intention and notifies the MS that the BS has been restarted. For example, a Control Processor Unit (CPU) of the BS can be shut down and restarted when the critical error happened. When the previously received restart count value is different from the currently received restart count value, the MS performs a network entry procedure with the BS. Hereinafter, the connection, state and configuration synchronization is referred to as the state synchronization.

First Embodiment

In the first embodiment of the present invention, a BS newly defines a BS RESET INDication (BS_RESET_IND) message as a message for indicating whether the CPU has been restarted. The BS includes a restart count field corresponding to CPU restart count information in the BS_RESET_IND message, and periodically or a periodically broadcasts the BS_RESET_IND message to the MS. When the BS_RESET_IND message is received, the MS compares its restart count value with an old restart count value of the previously received BS_RESET_IND message. If the two values are different from each other, the MS performs a network entry procedure with the BS. Table 4 shows the newly defined BS_RESET_IND message format.

TABLE 4

| Syntax | Size | Notes |
|---|---|---|
| BS_RESET_IND_Format( ) { | | |
|     Management Message Type | 8 bits | |
|     Restart Count | 8 bits | |
| } | | |

As shown in Table 4, the BS_RESET_IND message, newly defined in the first exemplary embodiment of the present invention, includes a restart count field for indicating a count value according to restart of the BS. On the other hand, the BS_RESET_IND message is periodically or a periodically broadcast one or more times because MSs operating in a sleep or idle mode, as well as an MS operating in a normal state, should be able to receive the BS_RESET_IND message.

Herein, when initial ranging is performed and an MS registered in the BS first receives the BS_RESET_IND message, a restart count included in the BS_RESET_IND message is stored as an old restart count value.

On the other hand, the MS performing the initial ranging transmits a ranging request (RNG-REQ) message to the BS, and receives a ranging response (RNG-RSP) message from the BS. When the restart count field is included in the TLV encoding field of the RNG-RSP message, the MS performing the initial ranging can store the received restart count value as the old restart count value.

Figure 5:
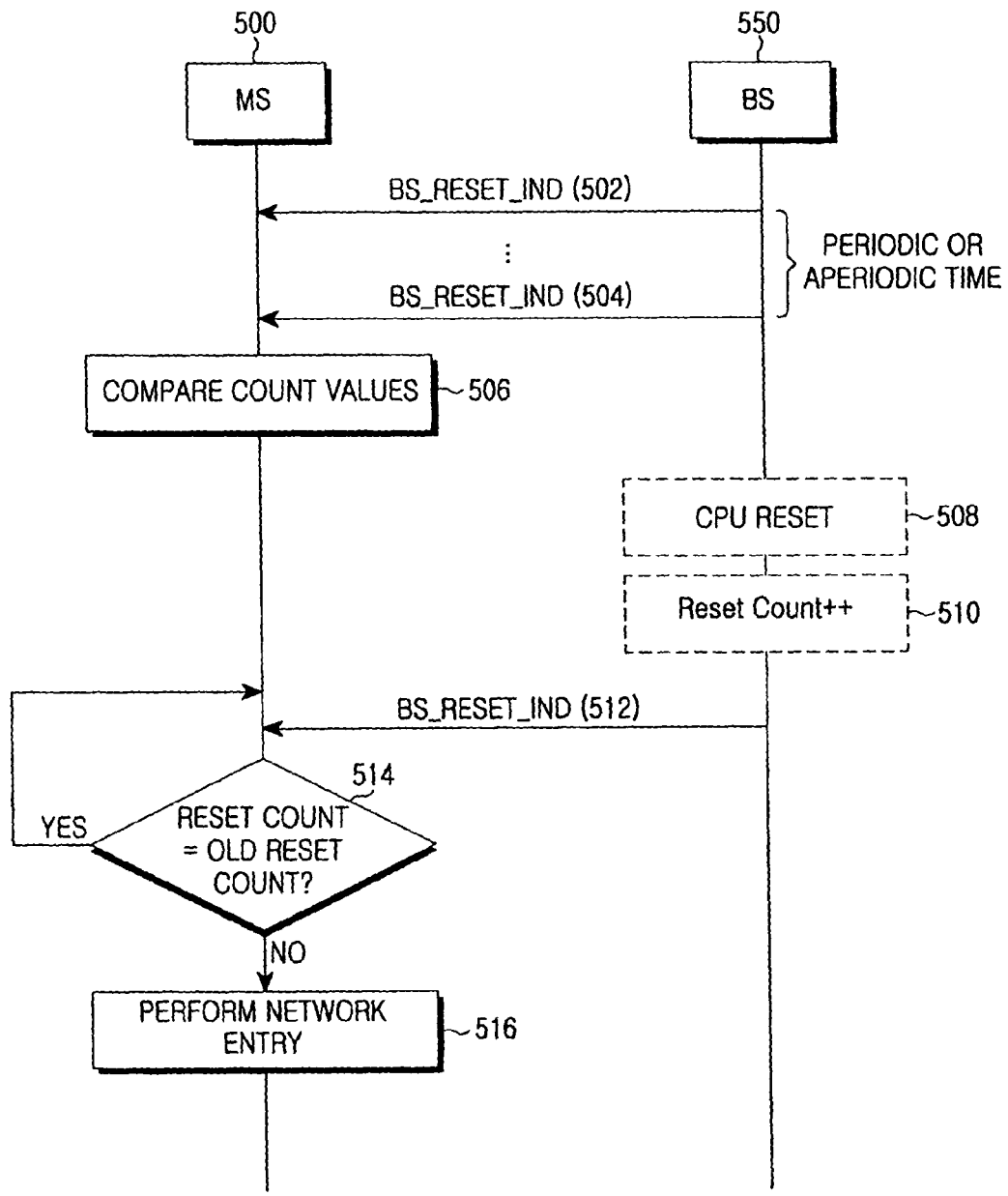
FIG. 5 is a signal flow diagram illustrating state synchronization between a BS and a Mobile Station (MS) in the mobile communication system in accordance with a first embodiment of the present invention.

FIG. 5 is a signal flow diagram illustrating state synchronization between a BS and an MS in the mobile communication system in accordance with the first embodiment of the present invention.

Referring to FIG. 5, the BS 550 periodically or aperiodically transmits a BS_RESET_IND message to the MS 500 (Steps 502 and 504). The MS 500 compares a current restart count value included in the received BS_RESET_IND message with a previously stored old restart count value whenever the message is received (Step 506).

If the CPU of the BS 550 has been restarted (Step 508), the BS 550 increments the restart count value by one (Step 510) and includes the incremented restart count value in the BS_RESET_IND message to transmit the BS_RESET_IND message to the MS 500 (Step 512).

The MS 500 receives the BS_RESET_IND message and determines whether the current restart count value included in the message is equal to the previously stored old restart count value (Step 514). If the two values are different, the MS determines that the CPU of the BS 550 has been restarted and performs a network entry procedure for state synchronization with the BS (Step 516).

Second Embodiment

In the second embodiment of the present invention a new DCD message is employed that is obtained by partially changing the conventional DCD message as a message for indicating whether the CPU has been restarted. The conventional DCD message includes a plurality of TLV encoding fields. The DCD message in accordance with the second exemplary embodiment of the present invention additionally includes a new restart count TLV encoding field. The restart count TLV encoding field can be defined as shown in Table 5.

TABLE 5

| Type | Length | Value |
|---|---|---|
| Restart Count | 1 | 0~255 |

As the CPU of the BS is restarted and the restart count value is changed, the restart count TLV encoding field can be included in the DCD message. When the CPU has not been restarted, the BS can broadcast the DCD message that does not include the restart count TLV encoding field. Upon receiving the DCD message without the restart count TLV encoding field, the MS determines that the restart count value is equal to the previous restart count value. Of course, the restart count TLV encoding field can be broadcast in every DCD message even when its restart count value is equal to the previous restart count value. The MS compares the restart count values and stores the currently received restart count value as the old restart count value.

On the other hand, the restart count TLV encoding field may be included in all DL messages using the TLV encoding field as well as the DCD message. For example, the restart count TLV encoding field may be periodically broadcast in a DL-MAP message.

Figure 6:
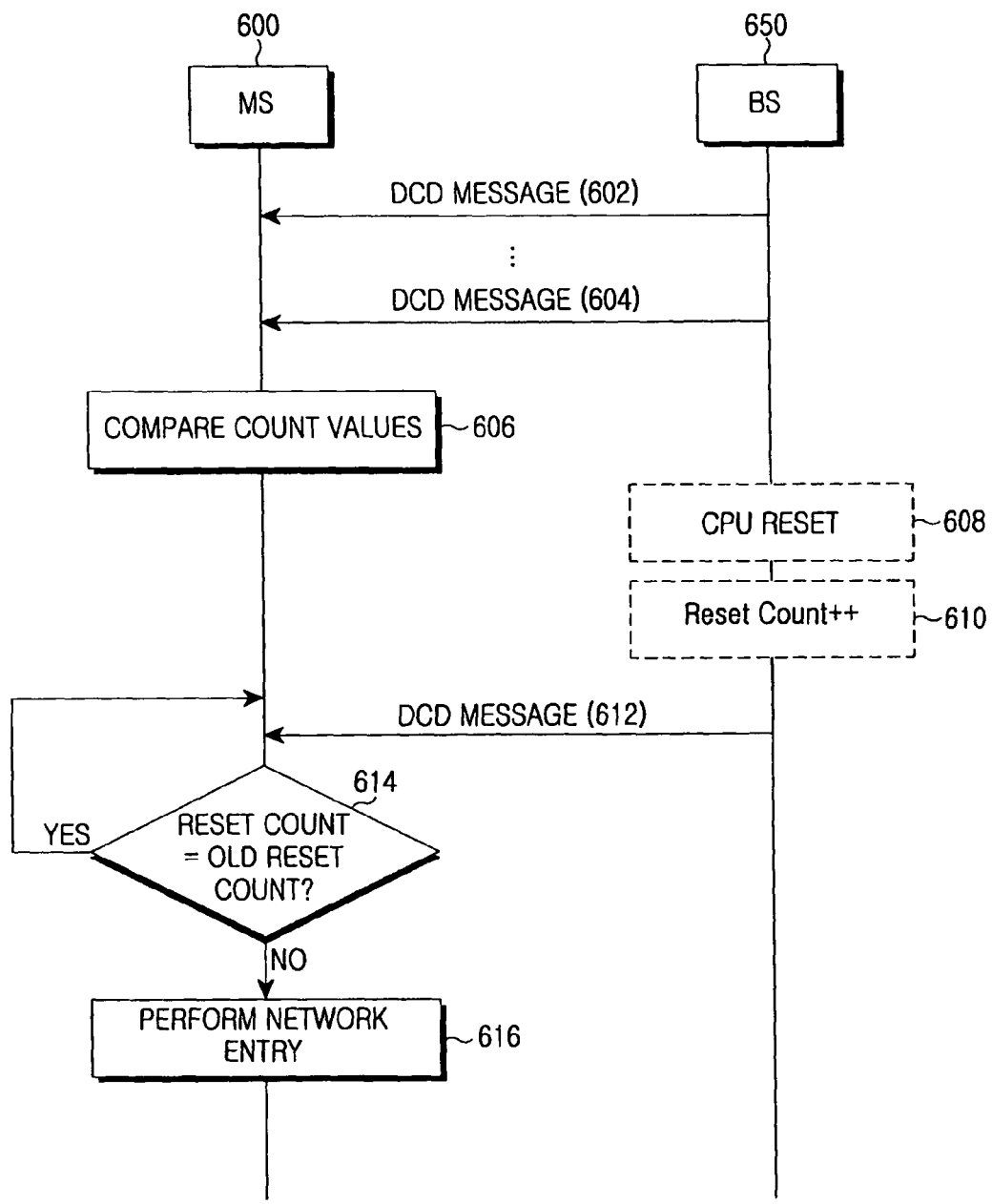
FIG. 6 is a signal flow diagram illustrating state synchronization between a BS and an MS in the mobile communication system in accordance with a second embodiment of the present invention.

FIG. 6 is a signal flow diagram illustrating state synchronization between a BS and an MS in the mobile communication system in accordance with the second embodiment of the present invention.

Referring to FIG. 6, the BS 650 periodically transmits a DCD message to the MS 600 (Steps 602 and 604). The MS 600 compares a current restart count value of a restart count TLV encoding field included in the received DCD message with a previously stored old restart count value whenever the message is received (Step 606).

If the CPU of the BS 650 has been restarted (Step 608), the BS 650 increments the restart count value by one (Step 610) and includes the incremented restart count value in the restart count TLV encoding field to transmit the DCD message to the MS 600 (Step 612).

The MS 600 receives the DCD message with a changed restart count value and determines whether the current restart count value included in the message is equal to the previously stored old restart count value (Step 614). If the two values are different, the MS determines that the CPU of the BS 650 has been restarted and performs a network entry procedure for state synchronization with the BS (Step 616).

Third Embodiment

In the third embodiment of the present invention corrected DLFP information is employed to indicate whether the CPU has been restarted. The corrected DLFP format is shown in Table 6.

TABLE 6

| Syntax | Size | Notes |
|---|---|---|
| DL_Frame_Prefix_Format( ) { | | |
| Used subchannel bitmap | 6 bits | Bit #0: Subchannels 0-11 are used<br>Bit #1: Subchannels 12-19 are used<br>Bit #2: Subchannels 20-31 are used<br>Bit #3: Subchannels 32-39 are used<br>Bit #4: Subchannels 40-51 are used<br>Bit #5: Subchannels 52-59 are used |
| Reserved | 1 bit | Shall be set to zero |
| Repetition_Coding_Indication | 2 bits | 00 - No repetition coding on DL-MAP<br>01 - Repetition coding of 2 used on DL-MAP<br>10 - Repetition coding of 4 used on DL-MAP<br>11 - Repetition coding of 6 used on DL-MAP |
| Coding_Indication | 3 bits | 0b000 - CC encoding used on DL-MAP<br>0b001 - BTC encoding used on DL-MAP<br>0b010 - CTC encoding used on DL-MAP<br>0b011 - ZT CC used on DL-MAP<br>0b100 to 0b111 - Reserved |
| DL-Map_Length | 8 bits | |
| Restart Count | 4 bits | |

The DLFP is information to be transmitted to the MS in an FCH in every frame. In accordance with the third exemplary embodiment of the present invention, the DLFP uses 4 bits of 5 reserved bits as a restart count. Herein, the restart count is set in the 4 bits as one example. The number of bits used for the restart count may be changed.

The MS compares a restart count value of the currently received DLFP with an old restart count value of the previously received DLFP. If the two values are different from each other, the MS performs a network entry procedure with the BS. Then, the MS stores the restart count value of the currently received DLFP as the old restart count value.

Figure 7:
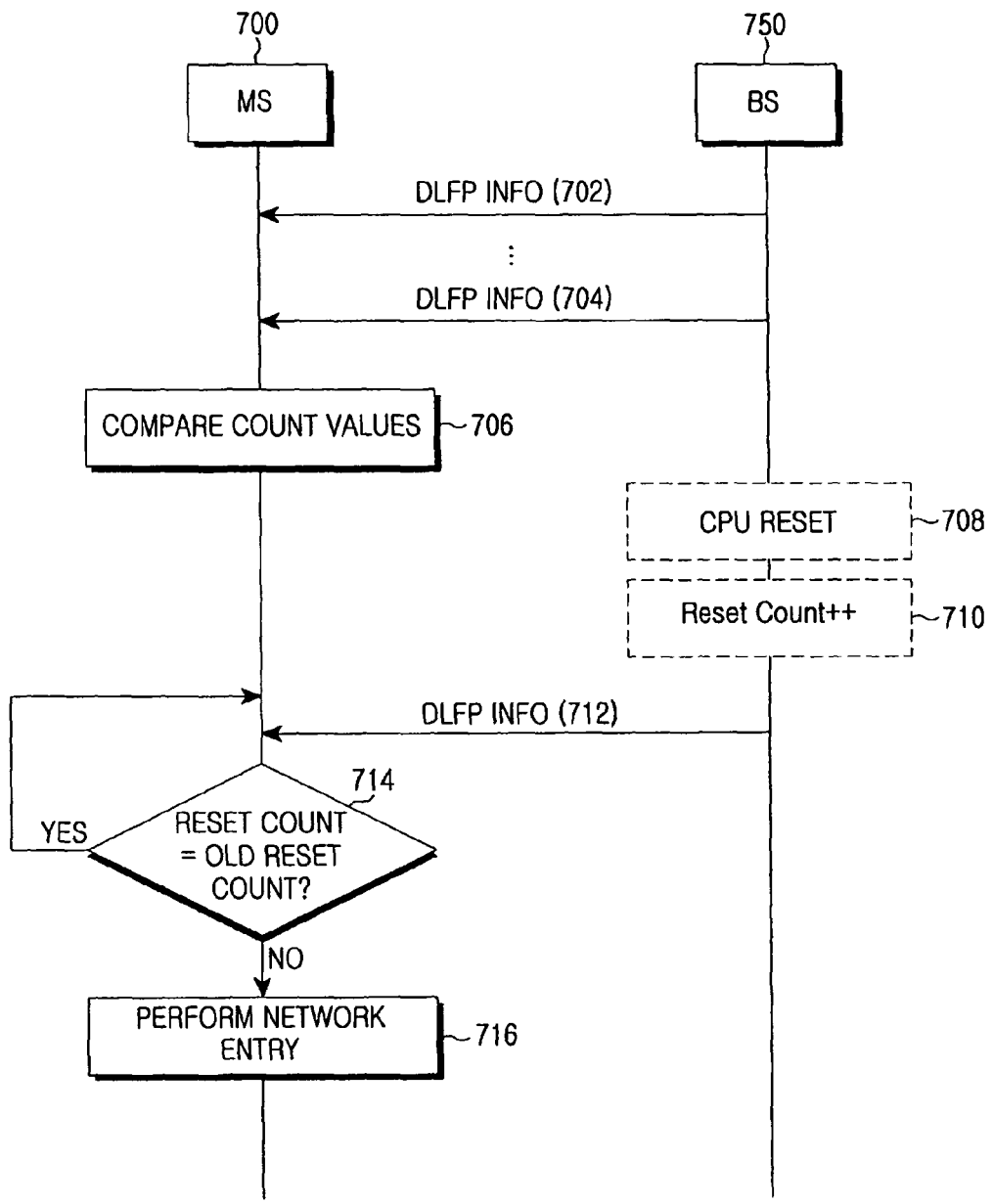
FIG. 7 is a signal flow diagram illustrating state synchronization between a BS and an MS in the mobile communication system in accordance with a third embodiment of the present invention.

FIG. 7 is a signal flow diagram illustrating state synchronization between a BS and an MS in the mobile communication system in accordance with the third embodiment of the present invention.

Referring to FIG. 7, the BS 750 periodically transmits a DL frame with DLFP information to the MS 700 (Steps 702 and 704). The MS 700 compares a current restart count value of the DLFP information included in an FCH of the received DL frame with a previously stored old restart count value whenever the information is received (Step 706).

If the CPU of the BS 750 has been restarted (Step 708), the BS 750 increments the restart count value by one (Step 710) and includes the incremented restart count value in the restart count field of the DLFP information to transmit the DLFP information to the MS 700 (Step 712).

The MS 700 receives the DLFP information with a changed restart count value and determines whether the current restart count value included in the DLFP information is equal to the previously stored old restart count value (Step 714). If the two values are different, the MS determines that the CPU of the BS 750 has been restarted and performs a network entry procedure for state synchronization with the BS (Step 716).

Figure 8:
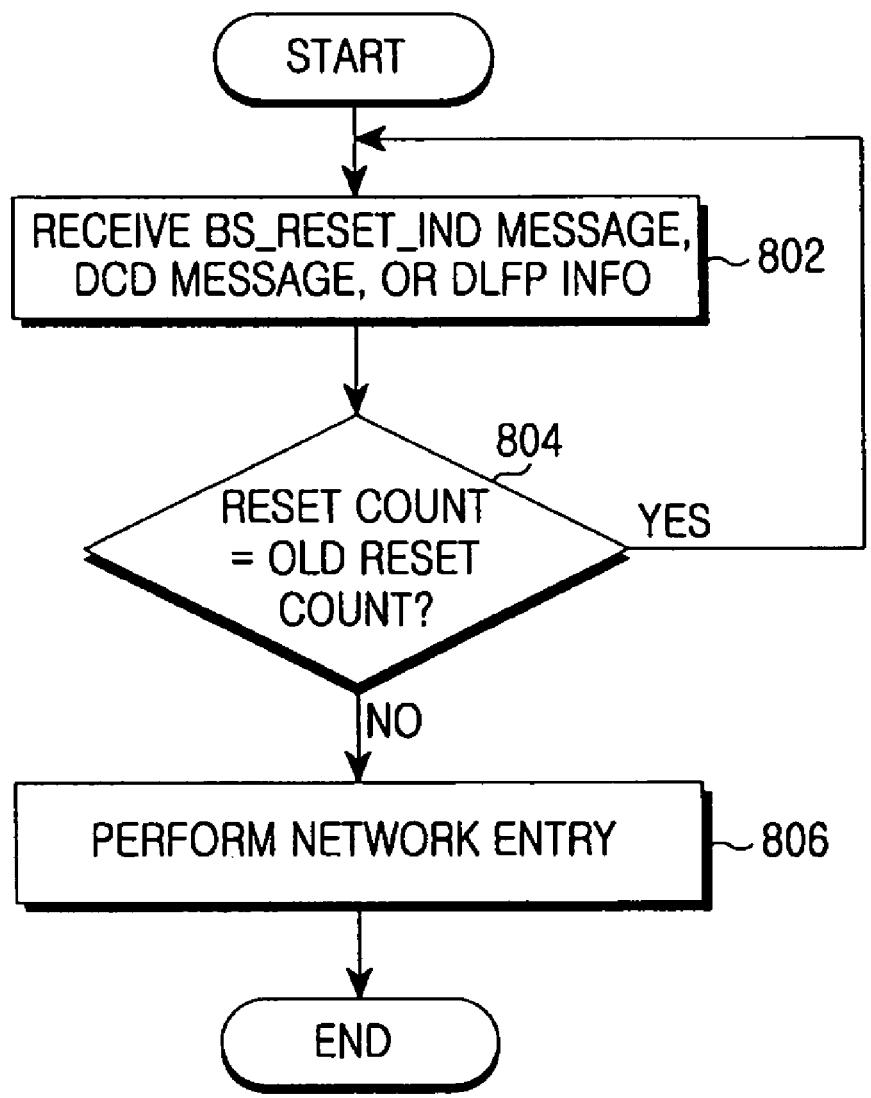
FIG. 8 is a flowchart illustrating an operation process of the MS for state synchronization with the BS in accordance with the present invention.

FIG. 8 is a flowchart illustrating an operation process of the MS for state synchronization with the BS in accordance with the present invention.

Referring to FIG. 8, the MS receives a BS_RESET_IND message, a DCD message with a restart count TLV encoding field, or DLFP information with a restart count field from the BS in step 802 and proceeds to step 804. In step 804, the MS compares a restart count value extracted from each message or the DLFP information with an old restart count value stored in the previous message or DLFP information. If the two values are the same, the MS determines that the CPU of the BS has not been restarted and proceeds to step 802. However, if the two values are different, the MS determines that state synchronization is not adequate by determining that the CPU of the BS has been restarted, and proceeds to step 806. In step 806, the MS performs a network entry procedure with the BS.

Figure 9:
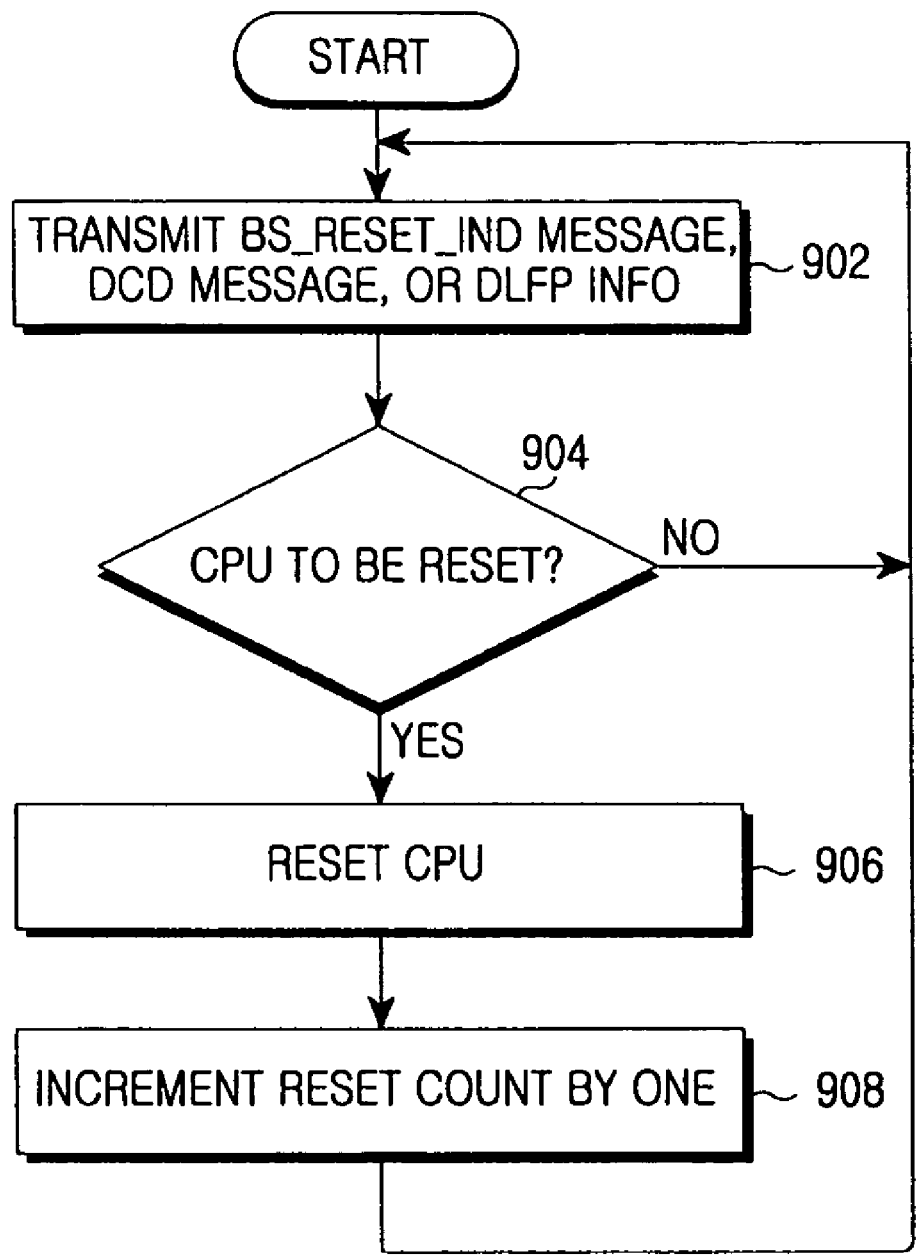
FIG. 9 is a flowchart illustrating an operation process of the BS for state synchronization with the MS in accordance with the present invention.

FIG. 9 is a flowchart illustrating an operation process of the BS for state synchronization with the MS in accordance with the present invention.

Referring to FIG. 9, the BS transmits a BS_RESET_IND message, a DCD message with a restart count TLV encoding field, or DLFP information with a restart count field to the MS in step 902 and proceeds to step 904. When the CPU is to be restarted in step 904, the BS proceeds to step 906. The BS restarts the CPU in step 906 and proceeds to step 908. The BS increments a restart count value by one in step 908, and includes the incremented restart count value in the BS_RESET_IND message, the DCD message, or the DLFP information in step 902.

As described above, a BS increments a restart count value by one after restarting its CPU and notifies an MS of the CPU restart. Of course, the present invention can employ a 1-bit indication value for notifying the MS of the CPU restart after or before the BS restarts the CPU. For example, the BS sets the restart indication value to one before restarting the CPU and broadcasts the restart indication value, such that the MSs can perform a network entry procedure after a predetermined time has elapsed. Alternatively, the BS sets the restart indication value to 1 after restarting the CPU and broadcasts the restart indication value, such that the MSs can perform a network entry procedure.

In accordance with the present invention, when the BS initializes state/configuration/connection information for all MSs managed thereby at one time, except for the case where the CPU of the BS is restarted, the BS intentionally increments a restart count and notifies the MSs of the incremented restart count. The MS receives the incremented restart count and determines that the BS has been restarted, thereby performing a network entry procedure.

When the CPU of the BS is restarted in the broadband wireless access communication system in accordance with the present invention, the BS notifies the MS of a restart count value changed according to restart. The MS compares a previous restart count value with a new restart count value. If the two values are different, the MS performs a network entry procedure, thereby maintaining state synchronization with the BS. When state, configuration and connection information of the MSs is to be initialized due to a problem in the BS itself, a network entry procedure can be performed in response to one command, such that resources can be efficiently managed.

Although, embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for state synchronization with a Base Station (BS) in a Mobile Station (MS) of a mobile communication system, comprising:
   receiving a current restart count value indicative of a number of times the BS restarts;
   comparing the received current restart count value with a previous restart count value stored in the MS; and
   performing a network entry procedure with the BS if the current restart count value is different from the previous restart count value.

2. A method for state synchronization with a Mobile Station (MS) in a Base Station (BS) of a mobile communication system, comprising:
   incrementing a current restart count value corresponding to a number of times the BS restarts; and
   transmitting the current restart count value to the MS to enable the MS to perform a network entry procedure with the BS if a stored restart count value in the MS is different from the transmitted current restart count value.

3. A system for state synchronization in a mobile communication system, comprising:
   a Base Station (BS) for setting a current restart count value corresponding to a number of times the BS restarts and transmitting the current restart count value; and
   a Mobile Station for receiving the current restart count value from the BS, comparing the received current restart count value with a previous restart count value stored in the MS, and performing a network entry procedure with the BS if the received current restart count value is different from the stored restart count value in the MS.

4. The method of claim 1, wherein the current restart count value is received via a Base Station Reset INDication (BS_RESET_IND) message.

5. The method of claim 1, wherein the current restart count value is received via a Type/Length/Value (TLV) encoding field in a Downlink Channel Descript (DCD) message.

6. The method claim 1, wherein the current restart count value is received via a DownLink Frame Prefix (DLFP).

7. The method of claim 2, wherein the current restart count value is transmitted via a Base Station Reset INDication (BS_RESET_IND) message.

8. The method of claim 2, wherein the current restart count value is transmitted via a Type/Length/Value (TLV) encoding field in a Downlink Channel Descript (DCD) message.

9. The method of claim 2, wherein the current restart count value is transmitted via a DownLink Frame Prefix (DLFP).

10. The system of claim 3, wherein the current restart count value is received via a Base Station Reset INDication (BS_RESET_IND) message.

11. The system of claim 3, wherein the current restart count value is received via a Type/Length/Value (TLV) encoding field in a Downlink Channel Descript (DCD) message.

12. The system of claim 3, wherein the current restart count value is received via a DownLink Frame Prefix (DLFP).

* * * * *